(12) United States Patent
Yasuda et al.

(10) Patent No.: US 7,456,890 B2
(45) Date of Patent: Nov. 25, 2008

(54) IMAGING DEVICE INCLUDING A VARIABLE SELECTOR CIRCUIT WHICH FILTERS AN OUTPUT SYNC PULSE

(75) Inventors: Minoru Yasuda, Kanagawa (JP); Katsunori Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 10/263,101

(22) Filed: Oct. 2, 2002

(65) Prior Publication Data
US 2003/0076426 A1 Apr. 24, 2003

(30) Foreign Application Priority Data
Oct. 3, 2001 (JP) .............................. 2001-307376

(51) Int. Cl.
H04N 5/235 (2006.01)
H04N 3/14 (2006.01)
H04N 5/335 (2006.01)
G03B 7/00 (2006.01)

(52) U.S. Cl. .................. 348/312; 348/320; 348/322; 348/311; 348/362; 348/230.1

(58) Field of Classification Search ................ 348/322, 348/229.1, 230.1, 303, 304, 320, 312, 319, 348/323, 311, 362, 364, 366
See application file for complete search history.

(56) References Cited

U.S. PATENT DOCUMENTS

| | | | | |
|---|---|---|---|---|
| 4,689,686 A | * | 8/1987 | Hashimoto et al. | 348/230.1 |
| 5,051,833 A | * | 9/1991 | Tsuji | 348/349 |
| 6,181,375 B1 | * | 1/2001 | Mitsui et al. | 348/240.99 |
| 6,707,498 B1 | * | 3/2004 | Toma et al. | 348/311 |
| 6,937,277 B1 | * | 8/2005 | Hattori et al. | 348/304 |
| 2001/0050715 A1 | * | 12/2001 | Sanpei | 348/312 |

* cited by examiner

*Primary Examiner*—David Ometz
*Assistant Examiner*—Richard M Bemben
(74) *Attorney, Agent, or Firm*—Robert J. Depke; Rockey, Depke & Lyons, LLC (57) ABSTRACT

An automatic exposure (AE) sensor includes a line-selecting circuit for line selection between horizontal lines and vertical lines, in addition to components of a typical AE sensor. The line-selecting circuit temporally filters a SYNC pulse for notifying a subsequent circuit about a pulse timing of an imaging signal to select a line to be read out and to cause the subsequent circuit to change an active pixel region. The number of selected lines is determined by an external input. The active pixel region is reduced when the AE sensor is incorporated in a device having a low performance CPU, thereby reducing load on the CPU. The active pixel region is increased when the AE sensor is incorporated in a device having a high performance CPU, thereby effectively using the CPU performance to achieve higher density control.

18 Claims, 5 Drawing Sheets

IMAGING DEVICE INCLUDING A VARIABLE SELECTOR CIRCUIT WHICH FILTERS AN OUTPUT SYNC PULSE

This application claims priority to Japanese Patent Application Number JP2001-307376 filed Oct. 3, 2001 which is incorporated herein by reference.

BACKGROUND OF THE INVENTION

1. Field of the Invention

The present invention relates to an imaging device having photosensors forming imaging pixels arranged into an array in an active pixel region provided on a semiconductor chip.

2. Description of the Related Art

Hitherto, silver cameras and digital still cameras have been equipped with an automatic exposure (AE) system for automatically metering the intensity of light to determine an exposure time.

Photodiodes are widely used as a sensor for use in an AE system for metering the intensity of light (hereinafter referred to as an "AE sensor").

Meanwhile, recent cameras have been equipped with an autofocus (AF) system having an auto-focusing capability, and require a multi-segment AE sensor in order to handle an increasing number of focal points. A sensor having an AF capability is hereinafter referred to as an "AF sensor".

In order to accommodate an AF sensor having a certain number of focal points, therefore, a specific multi-segment AE sensor is further required.

Furthermore, photodiodes are black-and-white sensors, which hinders a user from knowing color information.

In order to address such inconveniences, AE sensors capable of determining multi-segment information and color information using color CCD (charge-coupled device) solid imaging devices (CCD color sensors) have been on the market recently.

However, the CCD color sensor of this type becomes more multi-segmental than usual, and therefore provides further color information, leading to a heavy load on a CPU (central processing unit) in order to achieve the optimum automatic exposure using such information. Another dedicated CPU is thus required.

For this reason, such a CCD color AE sensor can only be incorporated in specific high-end cameras or high-end digital still cameras.

The configuration and operation of a CCD color AE sensor in the related art are described below in conjunction with a specific example.

Figure 4:
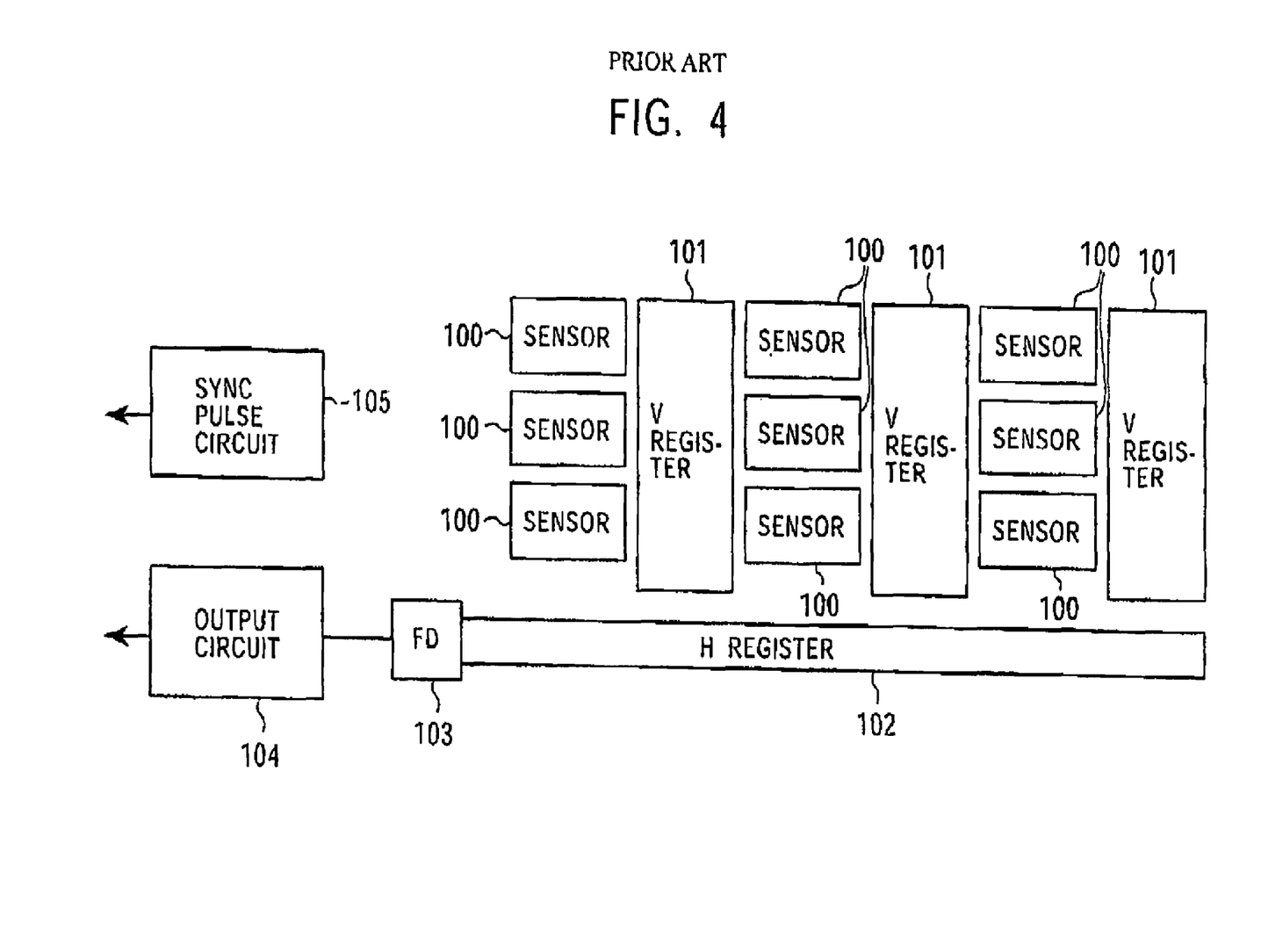
FIG. 4 is a block diagram of an AE sensor in the related art.

FIG. 4 is a block diagram of a CCD color AE sensor in the related art.

As shown in FIG. 4, photosensors 100 are formed into an array in a two-dimensional manner, i.e., vertically and horizontally, on a semiconductor chip, and a color filter (not shown) is provided on the top layer of each of the photosensors 100 for providing color information.

There are also provided vertical transfer (V) registers 101 which are CCD registers for transferring a charge photoelectrically converted by the photosensors 100, and a horizontal transfer (H) register 102 which is a CCD register for horizontally transferring the signal charge received from the V registers 101 to a floating diffuser (FD) unit 103 for converting the signal charge into a voltage signal.

In the FD unit 103, the signal charge transferred from the H register 102 is converted into a voltage signal in response to the transfer operation. An output circuit 104 outputs the voltage signal converted by the FD unit 103 to an external unit.

A SYNC pulse circuit 105 outputs a SYNC pulse for notifying a subsequent A/D circuit about the position of the output signal.

In general, an output timing of AE sensors is determined according to an output instruction from an external unit, and a pulse is therefore necessary for notifying a subsequent circuit about the position of the output signal. The SYNC pulse of the SYNC pulse circuit 105 is used to notify the subsequent circuit about the output signal position.

As indicated by arrows in FIG. 4, the signals are sent to external units from the output circuit 104 and the SYNC pulse circuit 105.

Figure 5:
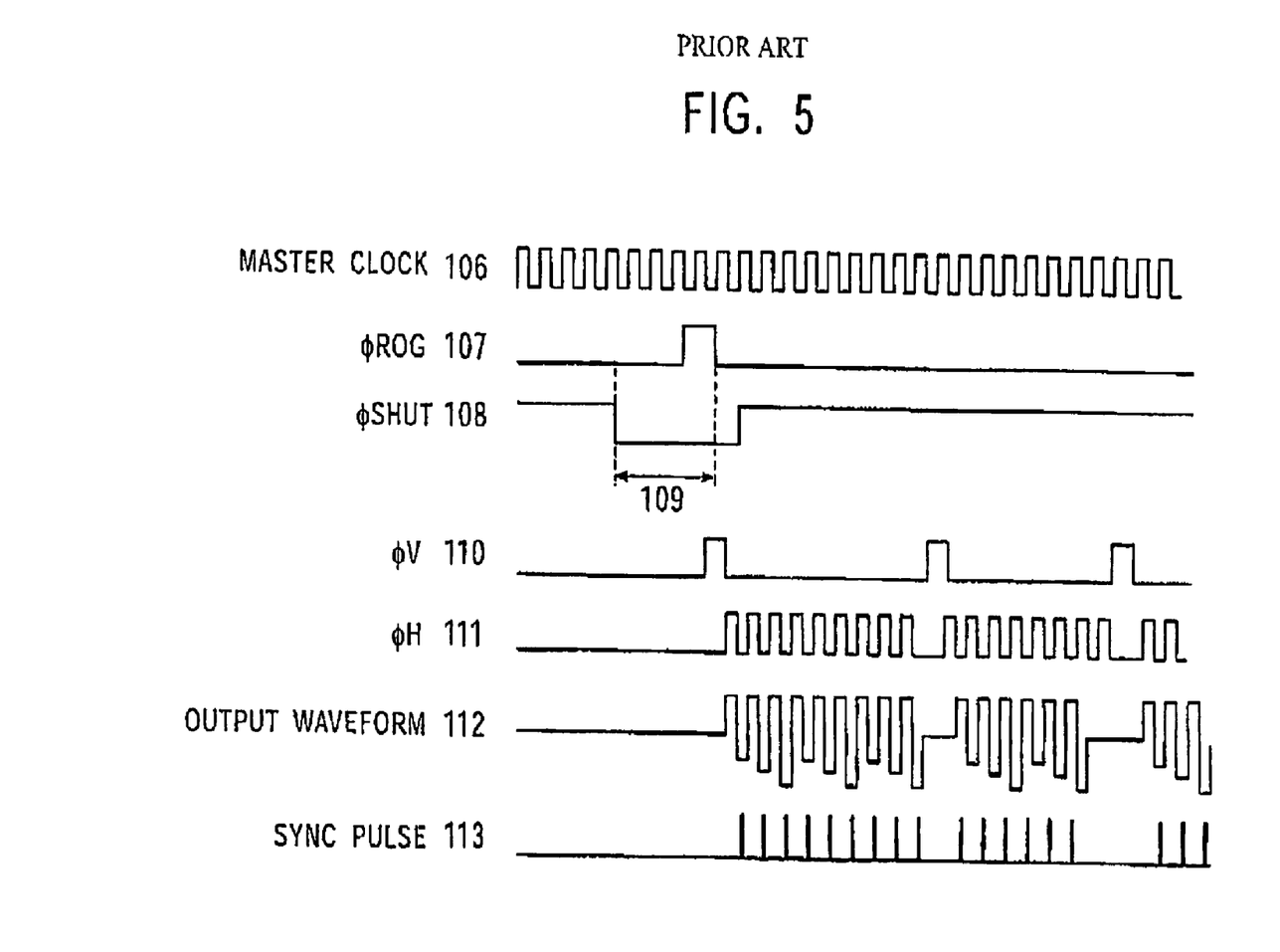
FIG. 5 is a timing chart showing the operation of the AE sensor shown in FIG. 4.

FIG. 5 is a timing chart showing the operation of the related art AE sensor shown in FIG. 4, depicting pulses necessary for the operation of the AE sensor, an output waveform output from the AE sensor, and a SYNC pulse notifying a subsequent A/D circuit about the position of the output signal.

In FIG. 5, a clock signal 106 is a master clock signal input to the AE sensor. The AE sensor internally generates pulses 107, 108, and 110 to 113 based on the clock signal 106 according to external instructions.

The pulse 107 is a read-out-gate (ROG) pulse which drives a charge to be transferred to the V registers 101 from the photosensors 100.

The pulse 108 is a shutter (SHUT) pulse which drains an unnecessary charge from the photosensors 100. When the pulse 108 is high, the charge is drained.

The pulse 110 is a V register pulse which drives the V registers 101 to transfer a charge generated by the photosensors 100.

The pulse 111 is an H register pulse which drives the H register 102 to transfer to the FD unit 103 the charge received from the V registers 101.

The pulse 112 is an output waveform output from the output circuit 104.

The pulse 113 is a (SYNC) pulse for notifying a subsequent circuit about the output position of an active pixel.

The operation of the AE sensor is now described with reference to FIGS. 4 and 5.

The period during which a charge is stored in the photosensors 100 is defined by a pulse interval 109 between the $\phi$ROG 107 and $\phi$SHUT 108.

The charge stored in the period 109 is read out by the V registers 101 when the $\phi$ROG 107 is high.

When V registers 101 are switched from the high level to the low level, the charge read out by the V registers 101 is transferred to the H register 102. All charges are transferred from the H register 102 to the FD unit 103.

To the H register 102 which is now empty, a charge is again transferred from the V registers 101, and all charges are transferred from the H register 102 to the FD unit 103 again.

In this way, all sensor outputs are transferred to the FD unit 103.

The FD unit 103 converts the received charge into a voltage signal, and outputs the resulting signal in the output waveform (Vout).

Since an output of the AE sensor is usually desired at a desired timing by a photographer, the SYNC pulse 113 is output in a synchronous manner with the output signal so as to notify a subsequent A/D circuit about the output signal position.

The subsequent A/D circuit retrieves an output at this SYNC pulse timing. It is therefore necessary to output the SYNC pulse 113 so as to always correspond to an active pixel and an optical black (OPB) pixel (black reference pixel).

However, such an AE sensor in the related art requires a high performance CPU for a subsequent circuit, and can only be incorporated in specific high-end cameras or high-end digital still cameras. Therefore, there is a problem that such an AE sensor cannot be incorporated as a versatile component in a wide variety of devices including low-end models.

SUMMARY OF THE INVENTION

Accordingly, it is an object of the present invention to provide an imaging device used as an AE sensor which can control the number of active pixels, as desired, based on the CPU performance of a device incorporating the imaging device and which can be incorporated as a versatile component in a wide variety of devices.

In one aspect of the present invention, an imaging device including a semiconductor chip; a plurality of photosensors formed on the semiconductor chip into a two-dimensional array in the vertical-line and horizontal-line directions; a vertical transfer register and a horizontal transfer register for transferring a signal charge stored in the photosensors to an output unit for converting the signal charge into an imaging signal for output; a synchronous pulse output unit; and a horizontal line selection unit. The synchronous pulse output unit outputs a synchronous pulse for notifying a subsequent circuit about a pulse timing of the imaging signal. Based on an externally input control signal, the horizontal line selection unit selects a horizontal line for signal processing in response to the synchronous pulse, and designates an active pixel region to be processed as the imaging signal in the subsequent circuit.

In another aspect of the present invention, an imaging device includes a semiconductor chip; a plurality of photosensors formed on the semiconductor chip into a two-dimensional array in the vertical-line and horizontal-line directions; a vertical transfer register and a horizontal transfer register for transferring a signal charge stored in the photosensors to an output unit for converting the signal charge into an imaging signal for output; a synchronous pulse output unit; and a vertical line selection unit. The synchronous pulse output unit outputs a synchronous pulse for notifying a subsequent circuit about a pulse timing of the imaging signal. Based on an externally input control signal, the vertical line selection unit selects a vertical line for signal processing in response to the synchronous pulse, and designates an active pixel region to be processed as the imaging signal in the subsequent circuit.

In still another aspect of the present invention, an imaging device includes a semiconductor chip; a plurality of photosensors formed on the semiconductor chip into a two-dimensional array in the vertical-line and horizontal-line directions; a vertical transfer register and a horizontal transfer register for transferring a signal charge stored in the photosensors to an output unit for converting the signal charge into an imaging signal for output; a synchronous pulse output unit; and a vertical and horizontal line selection unit. The synchronous pulse output unit outputs a synchronous pulse for notifying a subsequent circuit about a pulse timing of the imaging signal. Based on an externally input control signal, the vertical and horizontal line selection unit selects vertical and horizontal lines for signal processing in response to the synchronous pulse, and designates an active pixel region to be processed as the imaging signal in the subsequent circuit.

In the imaging device according to the present invention, therefore, a horizontal line for signal processing in response to a synchronous pulse for notifying a subsequent circuit about a pulse timing of the imaging signal is selected based on an externally input control signal to designate an active pixel region to be processed as the imaging signal in the subsequent circuit. The number of active pixels can thus be controlled, as required, according to the performance of the subsequent circuit, such that the number of active pixels is reduced in a subsequent circuit having a low performance CPU to reduce load on the CPU while the number of active pixels is increased in a subsequent circuit having a high performance CPU to implement high functionality. This further makes it possible to control the number of active pixels after a device set has been assembled into the imaging device, thus allowing tolerances involved in assembling the device set to be accommodated. The imaging device can therefore be used as an AE sensor incorporated as a versatile component in a wide variety of devices.

Furthermore, in the imaging device according to the present invention, a vertical line for signal processing in response to a synchronous pulse for notifying a subsequent circuit about a pulse timing of the imaging signal is selected based on an externally input control signal to designate an active pixel region to be processed as the imaging signal in the subsequent circuit. The number of active pixels can thus be controlled, as required, according to the performance of the subsequent circuit, such that the number of active pixels is reduced in a subsequent circuit having a low performance CPU to reduce load on the CPU while the number of active pixels is increased in a subsequent circuit having a high performance CPU to implement high functionality. This further makes it possible to control the number of active pixels after a device set has been assembled into the imaging device, thus allowing tolerances involved in assembling the device set to be accommodated. The imaging device can therefore be used as an AE sensor incorporated as a versatile component in a wide variety of devices.

Furthermore, in the imaging device according to the present invention, vertical and horizontal lines for signal processing in response to a synchronous pulse for notifying a subsequent circuit about a pulse timing of the imaging signal are selected based on an externally input control signal to designate an active pixel region to be processed as the imaging signal in the subsequent circuit. The number of active pixels can thus be controlled, as required, according to the performance of the subsequent circuit, such that the number of active pixels is reduced in a subsequent circuit having a low performance CPU to reduce load on the CPU while the number of active pixels is increased in a subsequent circuit having a high performance CPU to implement high functionality. This further makes it possible to control the number of active pixels after a device set has been assembled into the imaging device, thus allowing tolerances involved in assembling the device set to be accommodated. The imaging device can therefore be used as an AE sensor incorporated as a versatile component in a wide variety of devices.

DESCRIPTION OF THE PREFERRED EMBODIMENTS

An embodiment of the present invention is now described with reference to the drawings.

Figure 1:
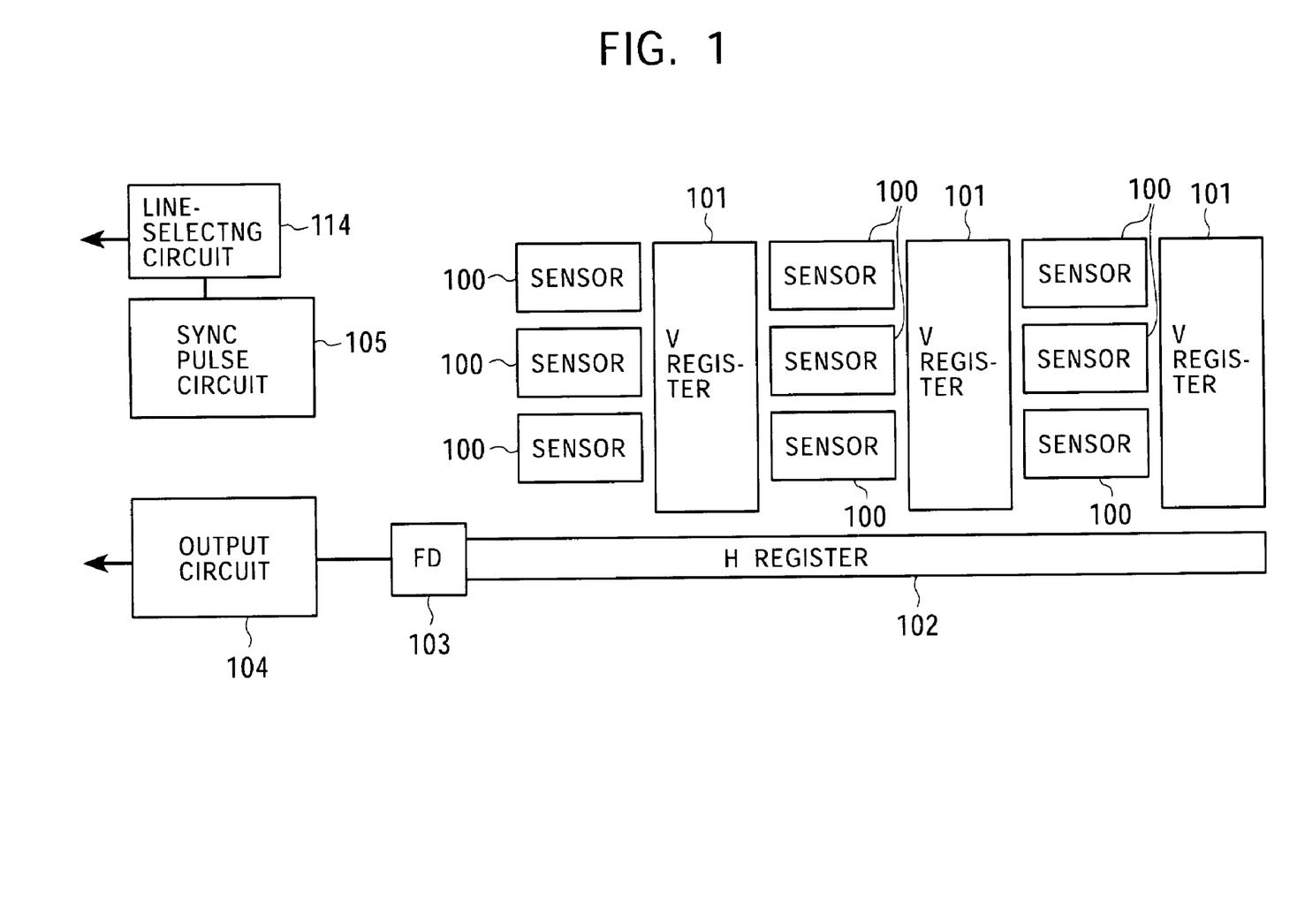
FIG. 1 is a block diagram of an imaging device (AE sensor) according to an embodiment of the present invention.

FIG. 1 is a block diagram of an imaging device (AE sensor) according to an embodiment of the present invention. Throughout the drawings, the same reference numerals are given to the same parts as those of the related art AE sensor shown in FIGS. 4 and 5.

Basically, the AE sensor according to this embodiment includes a line-selecting circuit 114 in addition to the components of the AE sensor shown in FIG. 4.

The line-selecting circuit 114 temporally filters the above-described SYNC (synchronous) pulse 113 to select a line to be read out and to instruct a subsequent circuit to change the active pixel region.

Figure 2:
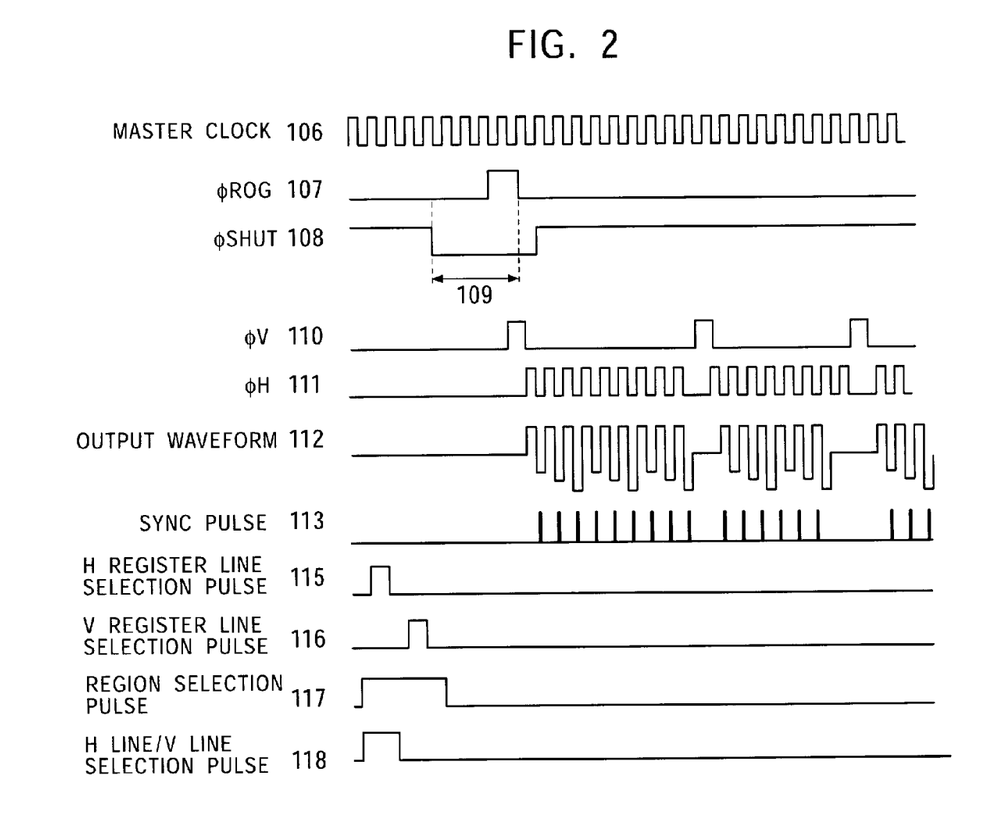
FIG. 2 is a timing chart showing the operation of the AE sensor shown in FIG. 1.

FIG. 2 is a timing chart showing the operation of the AE sensor shown in FIG. 1, depicting pulses necessary for the operation of the AE sensor, an output waveform output from the AE sensor, a SYNC pulse notifying a subsequent A/D circuit about the position of the output signal, and pulses for line selection by temporally filtering the SYNC pulse.

In the timing chart shown in FIG. 2, line selection pulses 115, 116, 117, and 118 are shown in addition to the signals 106 to 108 and 110 to 113 shown in FIG. 5.

The pulse 115 is a pulse for selecting the number of H lines, and the pulse 116 is a pulse for selecting the number of V lines.

The pulse 117 is a pulse for selection or non-selection of a region selection mode, indicating a selection mode when the pulse 117 is high and a non-selection mode when the pulse 117 is low.

The pulse 118 is a pulse for identifying line selection between the H lines and the V lines, indicating selection of the H lines when the pulse 118 is high and selection of the V lines when the pulse 118 is low.

The other signals shown in FIG. 2 are basically the same as those shown in FIG. 5, and the additional pulses 115, 116, 117, and 118 are focused on, in particular, to illustrate an active pixel region selecting method in the AE sensor according to this embodiment.

When the region selection pulse 117 is high, it is indicated that the region selection mode is switched to a selection mode. The number of counted master clocks when the line selection pulse 118 is high and when the H line number selection pulse 115 is high indicates the number of active pixel lines in the H lines. In this embodiment, therefore, the number of H lines to be selected is determined depending upon the number of master clocks which is externally input.

Likewise, the number of counted master clocks when the line selection pulse 118 is low and when the V line number selection pulse 116 is high indicates the number of active pixel lines in the V lines. In this embodiment, therefore, the number of V lines to be selected is determined depending upon the number of master clocks which is externally input.

The combination of the high level period of the V and H line number selection pulses 115 and 116 allows an active pixel region to be designated. The SYNC pulse 113 notifying the subsequent circuit about the signal position is temporally filtered according to the designated active pixel region information, thereby causing the SYNC pulse 113 to be sent only to the active pixel region that is externally selected.

As a result, only a signal indicating the selected active pixel region can be sent to the subsequent A/D circuit, thus allowing the desired active pixels to be selected.

Figure 3:
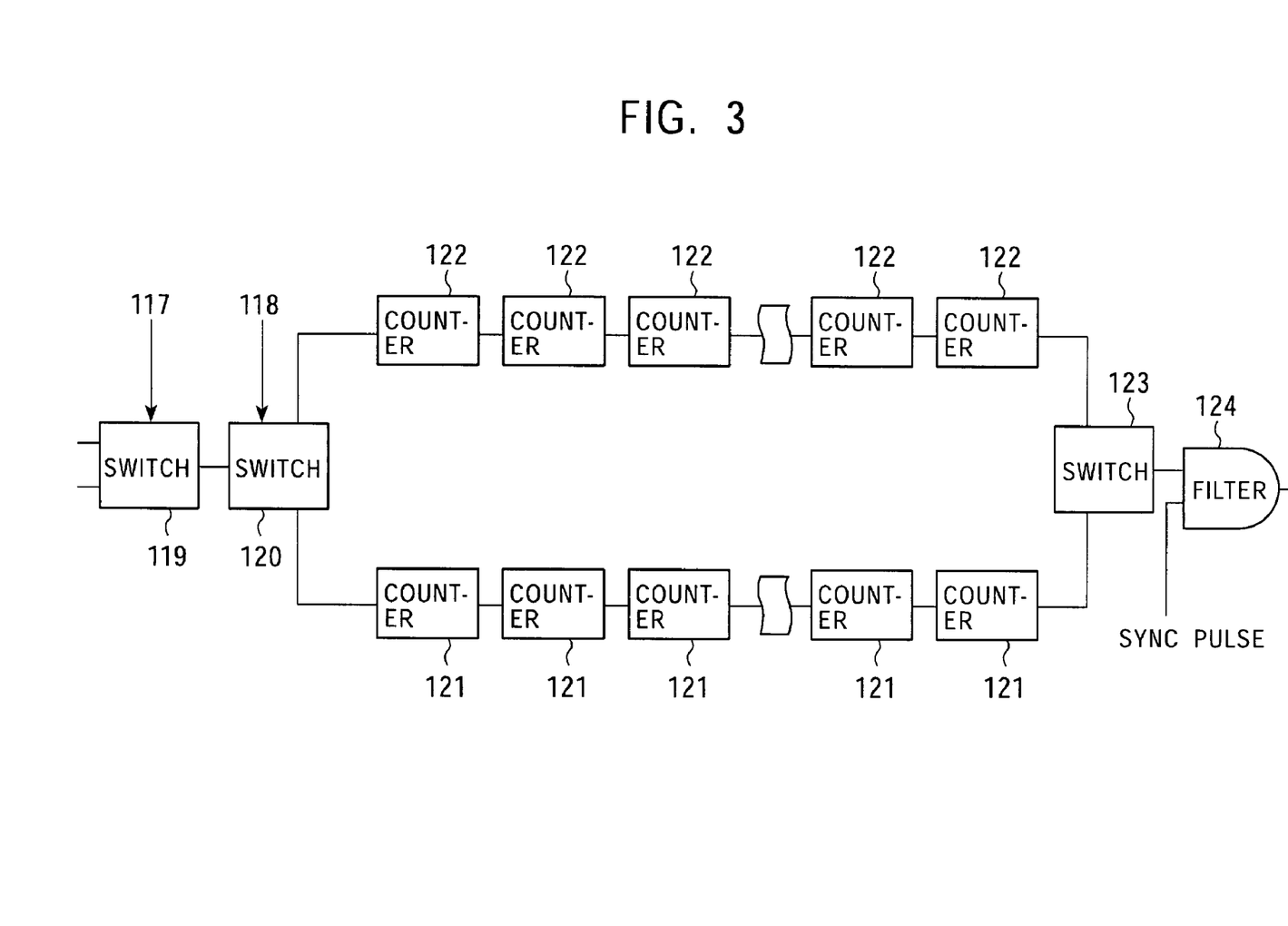
FIG. 3 is a block diagram of a logic circuit for implementing a line-selecting operation in the AE sensor shown in FIG. 1.

FIG. 3 is a block diagram of a logic circuit for implementing such a line-selecting operation.

A switch unit 119 switches between the region selection mode and the region non-selection mode. Upon receipt of a high signal, the switch unit 119 switches to the region selection mode.

A switch unit 120 switches line selection between the H lines and the V lines.

A counter 121 is a flip-flop circuit for storing a selected V line, and the counter 121 is prepared for each of the V lines.

A counter 122 is a flip-flop circuit for storing a selected H line, and the counter 122 is prepared for each of the H lines.

A switch unit 123 switches an output of the number of counters for between the stored H lines and V lines.

A filter unit 124 for temporally filtering the SYNC pulse is formed of an AND circuit which outputs a high signal as an output signal when the input from either the counter 121 or 122 and the input of the SYNC pulse are both high.

With this configuration, a SYNC pulse only for a selected line which is externally input can be sent to the subsequent A/D circuit, thus causing the subsequent A/D circuit to change the active pixel region.

In the AE sensor according to this embodiment, therefore, an active pixel region can be selectively set as required, thus making it possible to reduce the active pixel region in a device having a low performance CPU to reduce load on the CPU while increasing the active pixel region in a device having a high performance CPU to effectively use the CPU performance to achieve higher density control.

Furthermore, an active pixel region can be externally selected as desired, thus making it possible to control the active pixel region after a device set has been assembled. Therefore, tolerances involved in assembling the device set would be accommodated so that the device set can be assembled without a strict precision, thus, for instance, achieving a simplified assembling process.

The present invention is not limited to the illustrated embodiment, and a variety of modifications may be applied to an arrangement having a similar capability without departing from the scope and spirit of the invention.

For example, in place of the above-described configuration in which both a horizontal line and a vertical line are selected, either a horizontal line or a vertical line may be selected, in which case more straightforward configuration and control operation can be achieved.

What is claimed is:
1. An imaging device comprising:
a semiconductor chip;
a plurality of photosensors formed on the semiconductor chip into a two-dimensional array in the vertical-line direction and the horizontal-line direction;
a vertical transfer register and a horizontal transfer register for transferring an imaging signal read-out from the photosensors to an output;
synchronous pulse signal generating means for generating a synchronous pulse signal for notifying a subsequent circuit about a pulse timing of the imaging signal at the output; and
horizontal line selection means which selects a horizontal line for signal processing by temporally filtering the synchronous pulse signal based on an externally input control signal and outputting a filtered synchronous pulse signal, thereby designating an active pixel region to be processed in a subsequent circuit to determine automatic camera settings for capturing a subsequent image;

wherein said horizontal line selection means, by temporally filtering the synchronous pulse signal, causes only a subset of the imaging signals at the output to be processed by the subsequent circuit as a result of the filtered synchronous pulse signal containing a reduced number of the synchronous pulses; and wherein said horizontal line selection means comprises a counter circuit that counts a number of clock cycles passing during the assertion period of the externally input control signal prior to image read out and stores the count as determinative of the number of horizontal lines to select or skip during image read out by temporally filtering the synchronous pulse signal.

2. An imaging device according to claim 1, wherein the horizontal line selecting means sends the filtered synchronous pulse signal directly to the subsequent circuit.

3. An imaging device according to claim 1, wherein said externally input control signal is a horizontal line selection pulse, and the assertion period of the horizontal line selection pulse determines the number of horizontal lines to skip.

4. An imaging device according to claim 3, wherein said horizontal line selection means is comprised of a plurality of counters and a filter, wherein the filter comprises an and gate that receives the synchronous pulse signal and an output from said plurality of counters, and outputs a filtered synchronous pulse signal to said subsequent circuit.

5. The imaging device according to claim 1, wherein said horizontal line selection means further comprises a region selection mode switch for switching between a region selection mode and a non-region selection mode.

6. An imaging device comprising:
a semiconductor chip;
a plurality of photosensors formed on the semiconductor chip into a two-dimensional array in the vertical-line direction and the horizontal-line direction;
a vertical transfer register and a horizontal transfer register for transferring an imaging signal read-out from the photosensors to an output;
synchronous pulse signal generating means for generating a synchronous pulse signal for notifying a subsequent circuit about a pulse timing of the imaging signal at the output; and
vertical line selection means which selects a vertical line for signal processing based on an externally input control signal by temporally filtering the synchronous pulse signal based on an externally input control signal and outputting a filtered synchronous pulse signal, thereby designating an active pixel region to be processed in a subsequent circuit to determine automatic camera settings for capturing a subsequent image,
wherein said vertical line selection means, by temporally filtering the synchronous pulse signal, causes only a subset of the imaging signals at the output to be processed by the subsequent circuit as a result of the filtered synchronous pulse signal containing a reduced number of the synchronous pulses; and
wherein said vertical line selection means comprises a counter circuit that counts a number of clock cycles passing during the assertion period of the externally input control signal prior to image read out and stores the count as determinative of the number of vertical lines to select or skip during image read out by temporally filtering the synchronous pulse signal.

7. An imaging device according to claim 6, wherein the vertical line selecting means sends the filtered synchronous pulse signal directly to the subsequent circuit.

8. An imaging device according to claim 6, wherein said externally input control signal is a vertical line selection pulse, and the assertion period of the vertical line selection pulse determines the number of vertical lines to skip.

9. An imaging device according to claim 8, wherein said vertical line selection means is comprised of a plurality of counters and a filter, wherein the filter comprises an and gate that receives the synchronous pulse signal and an output from said plurality of counters, and outputs a filtered synchronous pulse signal to said subsequent circuit.

10. The imaging device according to claim 6, wherein said vertical line selection means further comprises a region selection mode switch for switching between a region selection mode and a non-region selection mode.

11. An imaging device comprising:
a semiconductor chip;
a plurality of photosensors formed on the semiconductor chip into a two-dimensional array in the vertical-line direction and the horizontal-line direction;
a vertical transfer register and a horizontal transfer register for transferring an imaging signal read-out from the photosensors to an output;
synchronous pulse signal generating means for generating a synchronous pulse signal for notifying a subsequent circuit about a pulse timing of the imaging signal at the output; and
vertical and horizontal line selection means which selects a subset of the imaging signal at the output for signal processing by temporally filtering the synchronous pulse signal based on one or more externally input control signals and outputting a filtered synchronous pulse signal, thereby designating an active pixel region to be processed in a subsequent circuit to determine automatic camera settings for capturing a subsequent image,
wherein the filtered synchronous pulse signal is transferred to the subsequent circuit such that the reduced number of synchronous pulses are used in the subsequent circuit to determine the active pixel region; and
wherein said vertical and horizontal line selection means comprises a counter circuit that separately counts a number of clock cycles passing during at least two separate assertion periods of the one or more externally input control signals prior to image read out and stores the counts as determinative of the number of horizontal and vertical lines to select or skip during image read out by temporally filtering the synchronous pulse signal.

12. An imaging device according to claim 11, wherein the vertical and horizontal line selecting means sends the filtered synchronous pulse signal directly to the subsequent circuit.

13. An imaging device according to claim 11, wherein there are at least two externally input control signals, the first externally input control signal being a vertical line selection pulse, and the assertion period of the vertical line selection pulse determines the number of vertical lines to skip; and
the second externally input control signal being a horizontal line selection pulse, and the assertion period of the horizontal line selection pulse determines the number of horizontal lines to skip.

14. An imaging device according to claim 11, wherein said vertical and horizontal line selection means is comprised of a plurality of counters and a filter, wherein the filter comprises an and gate that receives the synchronous pulse signal and an output from said plurality of counters, and outputs a filtered synchronous pulse signal to said subsequent circuit.

15. The imaging device according to claim 11, wherein the vertical and horizontal line selection means filters the synchronous pulse signal by preventing the assertion of the pulse, thereby preventing the notification to the subsequent circuit that valid image data is available at the output.

16. The imaging device according to claim 11, wherein said vertical and horizontal line selection means further comprises a first and second counter circuit and a counter switch for switching an input clock between the first counter circuit and second counter circuit based upon an H/V line selection pulse.

17. An imaging device comprising:
a semiconductor chip;
a plurality of photosensors formed on the semiconductor chip into a two-dimensional array in the vertical-line direction and the horizontal-line direction;
a vertical transfer register and a horizontal transfer register for transferring an imaging signal read-out from the photosensors to an output;
a signal processing circuit for determining automatic camera settings for capturing a subsequent image;
synchronous pulse signal generating means for generating a synchronous pulse signal for notifying the signal processing circuit about a pulse timing of the imaging signal at the output; and
a selection circuit which causes a subset of the imaging signal available at the output to be received by the signal processing circuit in both the vertical and horizontal directions, thereby designating an active pixel region to be processed by said signal processing circuit;
wherein the selection circuit causes the subset of the plurality of photosensors to be received by the signal processing circuit by temporally filtering the synchronous pulse signal based on an externally input control signal and outputting a filtered synchronous pulse signal, wherein the filtered synchronous pulse signal is transferred such that a reduced number of the synchronous pulses are used to determine the active pixel region; and
wherein said selection circuit comprises a counter circuit that counts a number of clock cycles passing during the assertion period of the externally input control signal prior to image read out and stores the count as determinative of the number of horizontal and vertical lines to select or skip during image read out by temporally filtering the synchronous pulse signal.

18. The imaging device according to claim 17, wherein said selection circuit further comprises a first and second counter circuit and a counter switch for switching an input clock between the first counter circuit and second counter circuit based upon an H/V Line selection pulse.

* * * * *